(12) United States Patent
Couillaud

(10) Patent No.: US 6,723,976 B2
(45) Date of Patent: Apr. 20, 2004

(54) OPTICAL DETECTOR WITH REGULATED EMISSION

(75) Inventor: Frédéric Couillaud, rue de la Tour Garnier (FR)

(73) Assignee: Schneider Electric Industries SA (FR)

( * ) Notice: Subject to any disclaimer, the term of this patent is extended or adjusted under 35 U.S.C. 154(b) by 242 days.

(21) Appl. No.: 09/956,795

(22) Filed: Sep. 21, 2001

(65) Prior Publication Data

US 2002/0038846 A1 Apr. 4, 2002

(30) Foreign Application Priority Data

Sep. 22, 2000 (FR) .............................. 00 12324

(51) Int. Cl.$^7$ .................................................. G01J 1/32
(52) U.S. Cl. ............ 250/205; 250/214 A; 250/214 AG; 356/3.04
(58) Field of Search ................... 250/205, 552, 250/553, 214 A, 214 AG; 359/341.42; 372/31, 29.014, 29.015, 29.021; 356/3.04

(56) References Cited

U.S. PATENT DOCUMENTS 5,621,205 A  *  4/1997  Warner et al. .............. 250/205

FOREIGN PATENT DOCUMENTS

| EP | 0623829 | * | 11/1994 |
| EP | 0926512 | * | 6/1999 |

\* cited by examiner

Primary Examiner—David Porta
Assistant Examiner—Stephen Yam
(74) Attorney, Agent, or Firm—Parkhurst & Wendel, L.L.P.

(57) ABSTRACT

Optical detector with pulsed emission, particularly of the background suppression cell type, with means for rapid regulation of the emission current.

When the voltage signal received V is located outside a regulation interval Z1, the emission current is multiplied or divided by a predetermined factor to bring the signal V rapidly within the interval Z1; when the signal V is within the interval Z1, the emission current is regulated by control means to attain a value corresponding to the adjustment of the signal V to a required value $V_{opt}$.

3 Claims, 1 Drawing Sheet

OPTICAL DETECTOR WITH REGULATED EMISSION

The present invention relates to an optical detector comprising a system for emission and reception capable of generating a pulsed emission electrical current and consequently of emitting a pulsed optical beam towards an object, and able to treat, by means of an electronic receiver circuit, a voltage signal received which is produced by the pulsed optical beam returned by the object according to the presence and/or distance of the object.

It is known from prior art that optical detectors, in particular background suppression optical cells, generate a reception voltage signal which can vary widely depending on whether the object detected sends back a low or high fraction of the energy emitted. Thus, for example, one needs to be able to raise the luminous intensity of emission in the presence of an object sending back little light. Besides, in the electronic circuits of such optical cells, it is necessary to avoid saturation of the amplification chains of the channels, this saturation disturbing detection, and thus it is advisable to be able to reduce the luminous emission intensity.

It is known from prior art how to use means of regulation of the emission current in the system of emission and reception of the optical cell, these regulation means varying the level of energy emitted through modification of the emission frequency of the current impulses. But, for certain types of cells, it may be necessary to retain an unchanged emission frequency, and the regulation means in question will then be unusable.

The aim of the invention is to regulate rapidly the emission current of an optical detector, in particular an object detection optical cell by triangulation, especially with background suppression, while conserving a stable transmission frequency of current impulses.

According to the invention, the means for transmission current regulation detect the value of the voltage signal received relative to a predetermined maximum voltage value and a minimum voltage value, these values defining a regulation interval as well as, on either side of this interval, a high voltage zone and a low voltage zone; on the other hand, the means of regulation are combined in such a way that, when the voltage signal received is situated in the regulation interval, the emission current is regulated by control means in such a way as to bring in and maintain the voltage signal received at a required value and that, when the voltage signal is situated in the upper zone or respectively in the low voltage zone, the emission current is multiplied (or divided) by a predetermined factor, such that the voltage signal is rapidly centred in the regulation interval, and then regulated by the control means.

The combination thus carried out for rapid correction and control is especially efficient. To begin with, a wide deviation of the received signal brings about an increase or decrease of the amplitude of the emission current, by a significant factor, which leads the received voltage signal during the regulation interval, then after that the final regulation of the emission current brings the received voltage signal to the required value. Through the first phase of quasi-exponential centring, the regulation operation is carried out very rapidly, that is to say within several emission cycles and in any case for a lower number of cycles than with prior art detectors.

The predetermined factor is at the most equal to the ratio of maximum and minimum voltage values or respectively minimum and maximum, for example of the order of 4 or ¼.

The control means can advantageously be constituted by a digital analog converter combined or not with a microcontroller which calculates the level of the emission current. The latter then generates impulses of modulated width applied to an integrator element, in such a way as to create an analog signal which defines an emission current making it possible to reach the required voltage value.

The description will be given below of a non-limiting embodiment of the invention, relating to the attached drawings.

Figure 1:
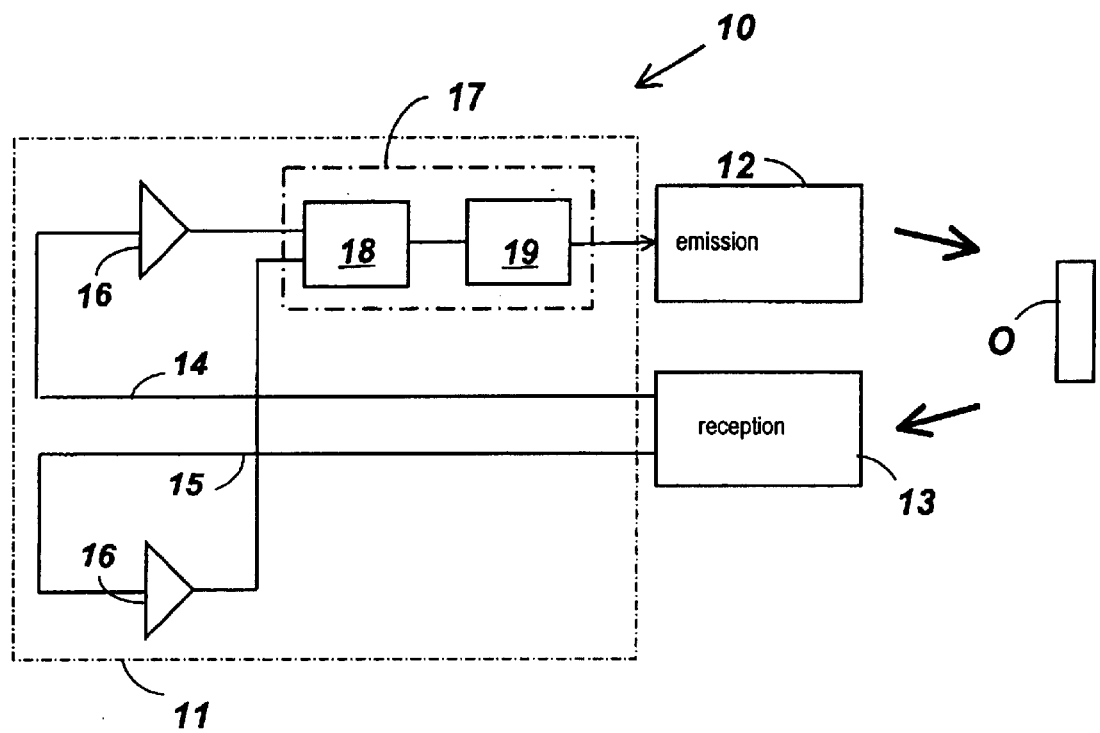
FIG. 1 shows a diagram of an optical detector according to the invention.

The optical detector represented in FIG. 1 is a triangulation detection cell comprising a system of emission and reception 10 provided with an electronic circuit 11 and associated software means, together with an electro-optical emitter unit 12 and an electro-optical receiver unit 13. The unit 12 emits a pulsed beam and, in the presence of an object O, unit 13 receives a corresponding beam. The cell in question is of the background suppression type and its electronic circuit 11 thus comprises a distant receiver channel 14 and a near receiver channel 15, but it could be of a different type. Each receiver channel has amplification means 16 whose output is applied to a command circuit 17 for the emission current.

Figure 2:
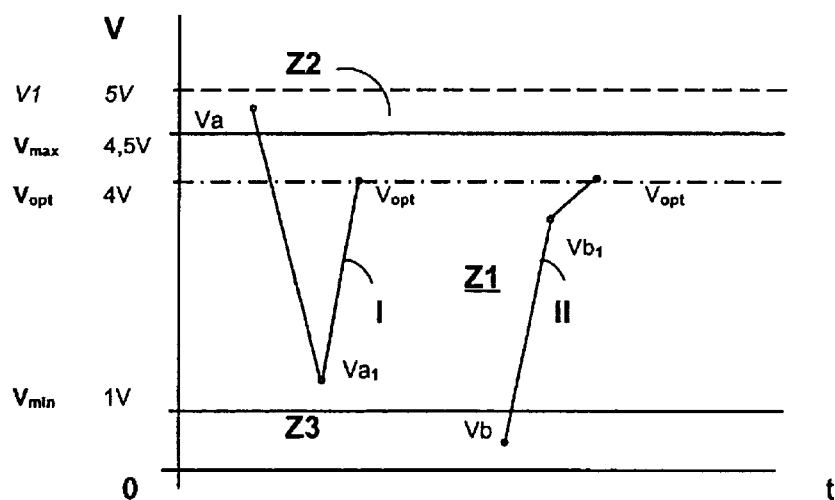
FIG. 2 is a diagram showing the evolution of the reception voltage of the detector of FIG. 1 during regulation operations.

The command circuit 17 has a controller 18, for example a microcontroller which, from the signals it receives, defines a voltage signal V and, according to the level of this signal, commands the emission current I, FIG. 2, in a differentiated way. (see FIG. 2).

For the voltage signal a maximum value $V_{max}$ and a minimum value $V_{min}$ are defined, determining between themselves a regulation interval Z1, as well as outside this interval a high zone Z2 and a low zone Z3, corresponding respectively to an over-saturation and an under-saturation of the amplification means.

When the voltage signal V is detected by the controller outside the interval Z1, that is to say in the zone Z2 above the maximum value $V_{max}$ or in the zone Z3 below the minimum value $V_{min}$, the controller 18 divides or multiplies by a fixed predefined factor k, for example of the order of 4, the amplitude of the emission current. This is aimed at recentring rapidly the resulting voltage signal to bring it into the convergence zone which constitutes the regulation interval Z1 ($V_{max}$, $V_{min}$).

When the voltage signal V is situated inside the interval Z1, either from the first impulse emission or from the emission following the recentring phase described above, the controller 18 brings the emission current to a value $I_{opt}$ giving a voltage signal $V_{opt}$, through a regulation obtained by impulse width modulation.

The controller 18 can be of the analog output type controlling the emission unit 12 directly. In a less expensive version, the controller has a digital output and is associated with a digital/analog converter 19, operating by elaboration of pulse width modulation (PWM) and integration by means of an RC circuit. In FIG. 2, I shows the case where the initial voltage signal Va is higher than $V_{max}$ and is brought down first of all to the value $Va_1$ comprised in Z1 before being brought to the value $V_{opt}$; and in II the case where the initial voltage signal Vb is lower than $V_{max}$ and is brought first of all to the value $Vb_1$ comprised in Z1 and then to the value $V_{opt}$.

In all cases, the voltage signal is lower than a value V1 defined by the amplification channel 16. As an example, V1 can be equal to 5V, $V_{max}$ to 4.5V, $V_{opt}$ to 4V and $V_{min}$ to 1V.

The factor k by which one multiplies or divides the emission current is for example of the order of 4. The final phase of regulation has the advantage of being carried out during a single emission cycle; in the final phase, if one marks by $\tau$ the cyclic ratio of modulation of command impulses at the beginning of this phase, circuit 18 changes this cyclic ratio into $\tau_{opt}=\tau \times V_{opt}/V_{a1}$ (or $V_{opt}/V_{b1}$), in such a way that the emission current is modified in proportion and that the voltage signal V is brought to the required value $V_{opt}$.

What is claimed is:

1. An optical detector comprising a system for emission and reception capable of generating a pulsed emission electrical current and consequently emitting a pulsed optical beam towards an object and able to process a voltage signal received which is produced by the pulsed optical beam returned by the object and according to the presence and/or distance of the object, the system of emission and reception comprising means for regulation of an emission current, which detect the value (V) of a voltage signal received relative to a maximum voltage value ($V_{max}$) and a regulation value of minimum voltage ($V_{min}$) which are predetermined, these values defining a regulation interval (Z1) together with a zone of high voltage (Z2) and a zone of low voltage (Z3), and the means of regulation are combined in such a way that, when the voltage signal (V) is situated in the regulation interval (Z1), the emission current is regulated by control means (18,19) to bring the voltage signal to a required value ($V_{opt}$) and, when the voltage signal (V) is situated in the high zone (Z2) or the low zone (Z3), the emission current is multiplied or divided by a predetermined factor (k) which is at most equal to the ratio of the maximum and minimum voltage values $V_{max}/V_{min}$ or respectively minimum and maximum $V_{min}/V_{max}$, so that the voltage signal is centered rapidly in the regulation interval (Z1), and then regulated by control means (18,19).

2. A detector according to claim 1, wherein when the voltage signal (V) is situated in the regulation interval (Z1), the emission current is multiplied by a factor according to the ratio between the value of the required voltage ($V_{opt}$) and the voltage value ($V_{a1}$, $V_{b1}$) of the signal received.

3. A detector according to claim 1, wherein the control means comprise a microcontroller (18) associated with means (19) for modulation and integration of pulse of modulated width, to create an analog signal which determines the emission current corresponding to the required voltage value to be attained ($V_{opt}$).

* * * * *